United States Patent [19]

Vivace

[11] Patent Number: 4,706,453
[45] Date of Patent: Nov. 17, 1987

[54] SUPPORT AND SEAL ASSEMBLY

[75] Inventor: Robert T. Vivace, Indianapolis, Ind.

[73] Assignee: General Motors Corporation, Detroit, Mich.

[21] Appl. No.: 929,480

[22] Filed: Nov. 12, 1986

[51] Int. Cl.$^4$ ............................ F02K 3/10; F02K 1/00
[52] U.S. Cl. ........................................ 60/271; 60/261; 60/264
[58] Field of Search ................. 60/261, 264, 265, 271, 60/39.32, 752, 755; 239/127.1, 127.3

[56] References Cited

U.S. PATENT DOCUMENTS

| | | | |
|---|---|---|---|
| 2,735,262 | 2/1956 | Geary | 60/261 |
| 2,794,319 | 6/1957 | Stockdale . | |
| 2,795,108 | 6/1957 | Saldin | 60/39.31 |
| 2,846,842 | 8/1958 | Brown | 60/261 |
| 2,851,854 | 9/1958 | Doll, Jr. | 60/261 |
| 2,974,486 | 3/1961 | Edwards | 60/261 |
| 3,666,251 | 5/1972 | McMurtry et al. | 263/50 |
| 3,826,088 | 7/1974 | Nash et al. | 60/261 |
| 3,848,697 | 11/1974 | Jannot et al. | 181/33 |
| 3,866,417 | 2/1975 | Velegol | 60/261 |
| 4,037,405 | 7/1977 | Huenniger et al. | 60/229 |
| 4,044,555 | 8/1977 | McLoughlin et al. | 60/264 |
| 4,071,194 | 1/1978 | Eckert et al. | 60/755 |
| 4,203,286 | 5/1980 | Warburton | 60/271 |

*Primary Examiner*—Louis J. Casaregola
*Assistant Examiner*—Donald E. Stout
*Attorney, Agent, or Firm*—Saul Schwartz

[57] ABSTRACT

A support and seal assembly for attaching porous metal transition duct liner segments to a transition duct of a gas turbine engine. The assembly includes an elongated retainer attached to the duct and separated therefrom to define a retention space therebetween. Panel supports are rigidly attached to adjacent ones of the liner segments and extend perpendicular to adjacent side edges of the liner segments. Distal ends of the panel supports project into the retention space from opposite sides of the retainer and are captured in the retention space to attach the liner segments to the duct. A pair of resilient sealing strips are mounted on the retainer and include sealing nodes which are self-biased against respective ones of the liner segments along the side edges thereof to seal the gap between the adjacent liner segments.

4 Claims, 4 Drawing Figures

U.S. Patent   Nov. 17, 1987   Sheet 1 of 3   4,706,453

SUPPORT AND SEAL ASSEMBLY

BACKGROUND OF THE INVENTION

1. Field of the Invention

This invention relates generally to exhaust systems in gas turbine engines and, more particularly, to a support an seal assembly for transpiration cooled, porous metal transition duct liner segments in such exhaust systems.

2. Description of the Prior Art

In some gas turbine engines, a transition duct defines a hot gas flow path from an aft turbine stage of the engine to an exhaust nozzle or other exhaust discharge. To suppress the radiation signature of the engine and/or to maintain the structural integrity of the transition duct, it is known to provide air cooled liners between the duct and the hot gases. Typically, the liners are annular louvered walls supported on and in spaced relation to the transition duct. Cooling air is routed to the space between the liner and the duct at a pressure exceeding the gas pressure in the exhaust gas flow path. The cooling air flows through the louvers and defines a cooling film on the surface of the liner exposed to the hot gases. The louvered construction is structurally advantageous because the louvers readily accommodate thermal growth of the liners. The louvered construction, however, is subject to high cooling airflow rates. As an alternative to the louvered construction, porous metal panels such as disclosed in U.S. Pat. No. 3,584,972, issued on June 15, 1971 to Bratkovich et al. and assigned to the assignee of this invention, may be used as liner segments between the duct and the hot gases and offer the advantage of more efficient use of cooling air. However, because unsealed slots or louvers between the porous metal liner segments must be avoided, supporting the liner segments on the duct and sealing between the edges of adjacent segments while still accommodating thermal growth represents a considerable design challenge. A liner segment support and seal assembly according to this invention represents a novel response to that challenge.

SUMMARY OF THE INVENTION

This invention is a new and improved support and seal assembly whereby porous metal transition duct liner segments, interposed between gas turbine engine exhaust gases and a transition duct of the engine, are supported on and in spaced relation to the transition duct with the space or plenum between the duct and liner segments being charged with cooling air at a pressure exceeding the exhaust gas pressure and with the spaces or gaps between adjacent liner segment side edges being sealed by the support and seal assembly. The new and improved support and seal assembly includes an elongated retainer on the duct extending in the gas flow direction and a plurality of panel supports rigidly attached to each of the adjacent liner segments at intervals along and extending perpendicular to the adjacent side edges of the liner segments, the retainer having an inboard surface separated from the duct and defining therebetween a retention space and each of the liner supports extending from opposite sides of the retainer into the retention space whereby the adjacent side edges of the liner segments are attached to and retained on the duct. The new and improved support and seal assembly further includes a first flexible seal strip with a sealing node thereon and a second flexible sealing strip with a sealing node thereon, the first and second sealing strips being rigidly attached to an outboard surface of the retainer opposite the aforementioned inboard surface thereof with one of the sealing nodes engaging a first of the adjacent liner segments in continuous line contact along one side edge thereof and the other of the sealing nodes engaging the other of the adjacent liner segments in continuous line contact along the adjacent side edge thereof so that an air seal is defined across the gap between the adjacent liner segments. In a preferred embodiment of the new and improved support and seal assembly, lifting tabs are defined on each of the sealing strips outboard of the sealing nodes and cams are provided on each of the liner segments which engage the lifting tabs to enhance the self-bias of the sealing strips and further urge the sealing nodes against the liner segments.

DESCRIPTION OF THE PREFERRED EMBODIMENT

Figure 1:
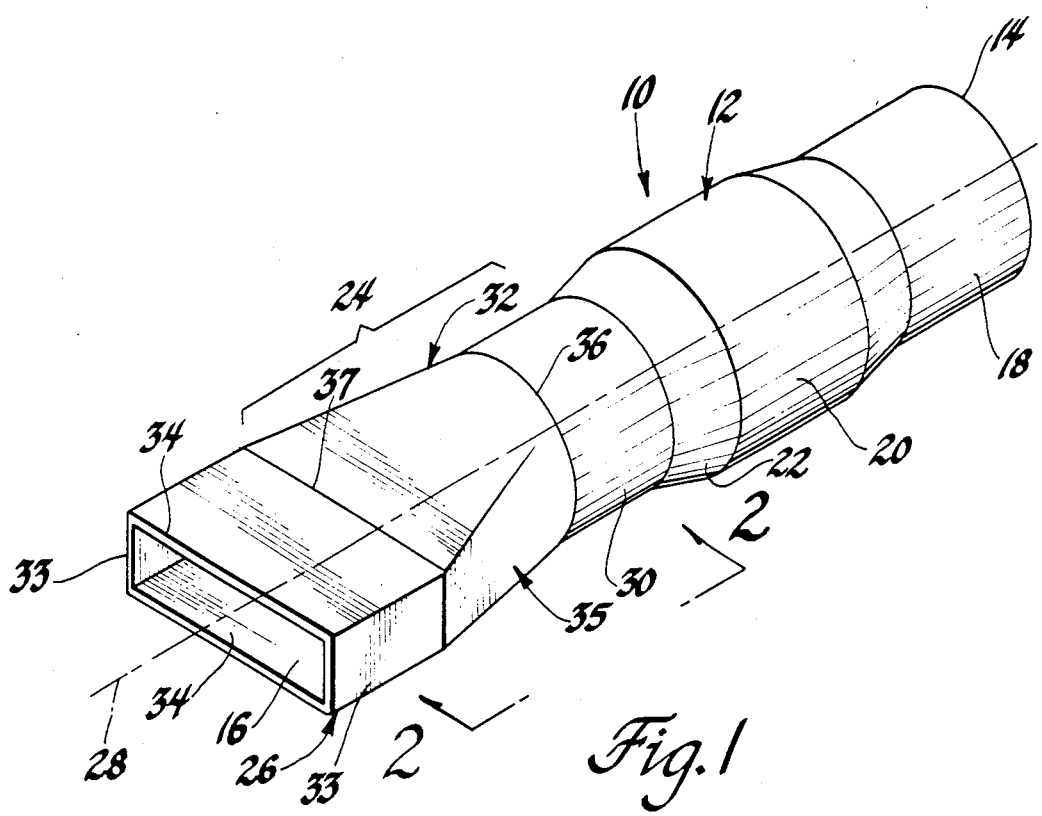
FIG. 1 is a perspective view of a schematically illustrated gas turbine engine having a transition duct with porous metal liner segments mounted thereon by a plurality of support and seal assemblies according to this invention.

Referring now to FIG. 1 of the drawings, a typical aviation gas turbine engine 10 is schematically illustrated in perspective view and includes a generally cylindrical case assembly 12 extending from a forward end 14 to an aft end 16 of the engine. The engine 10, which forms no part of this invention and is illustrated for reference only, includes a compressor section 18, a combustor section 20, a gasifier turbine section 22, an afterburner or augmentor section 24 and a discharge nozzle 26, all aligned on a longitudinal axis 28 of the engine. In conventional fashion, a compressor in the compressor section 18 compresses air ingested at the forward end 14 of the engine and provides a continuous supply of compressed air to the combustor section 20 for supporting combustion therein. The hot gases generated in the combustor section flow through turbine stages in the turbine section 22, where energy is extracted to drive the compressor, and then exhaust into the afterburner section 24.

The energy content of the gases exhausting from the turbine section 22 is augmented by combustion of additional fuel supplied through afterburner nozzles, not shown, in a cylindrical combustion section 30 of the afterburner section 24. The augmented gases are conveyed from the combustion section 30 to the nozzle 26 through a transition duct 32 of the afterburner section 24. The nozzle 26, a so-called 2D nozzle, defines a rectangular cross sectional flow area and includes a pair of vertical side walls 33 and a pair of horizontal walls 34 which may be adjusted for various aircraft flight modes.

Figure 2:
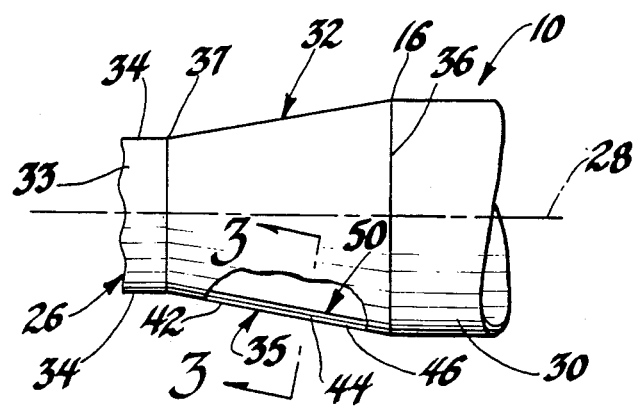
FIG. 2 is a partially broken-away view taken generally along the plane indicated by lines 2—2 in FIG. 1.
Figure 3:
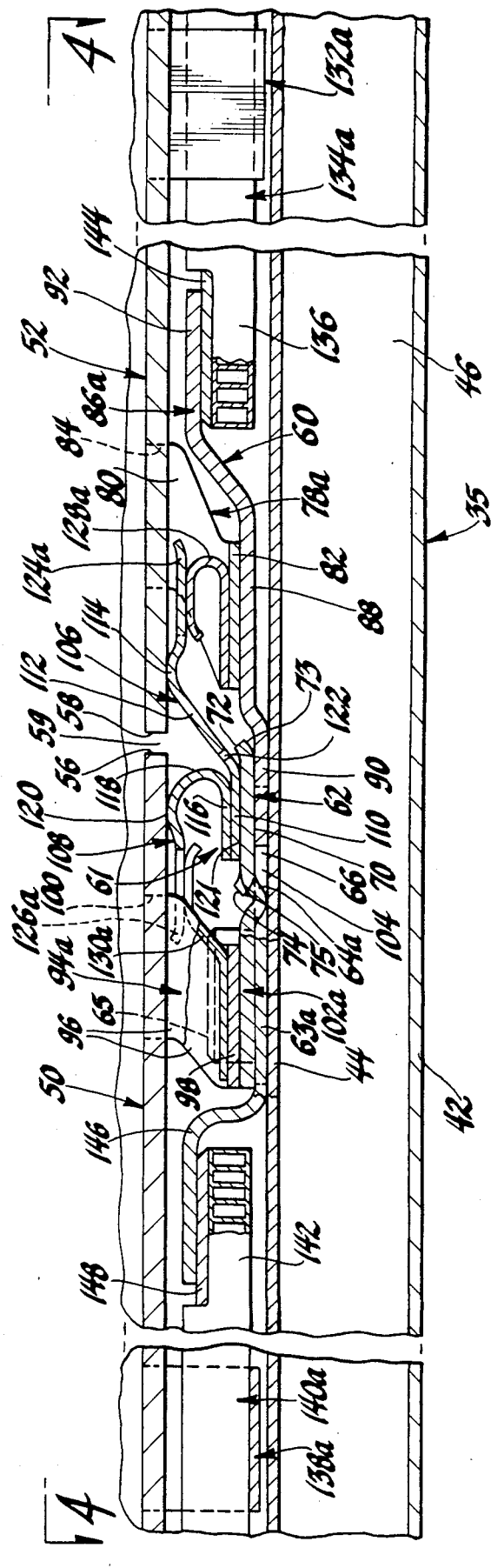
FIG. 3 is an enlarged sectional view taken generally along the plane indicated by lines 3—3 in FIG. 2.

The transition duct 32 has a variable cross section flow area defined by a duct wall 35. The duct wall 35 has a circular end 36 adjacent the aft end of the combustion section 30, a rectangular end 37 adjacent the nozzle 26, and a variable configuration intermediate portion between the ends. The intermediate wall portion, illustrated in magnified fashion for clarity in FIGS. 2 and 3, is a two-panel composite including an outer panel 42 and an inner panel 44. A cooling air channel 46 is defined between the inner and outer panels and is charged by the compressor of the engine with relatively cool compressed air at a pressure exceeding the gas pressure in the exhaust gas flow path in the transition duct.

The inner panel 44 is shielded from the hot exhaust gases by a liner which extends in the direction of axis 28 between the circular and rectangular ends 36 and 37, respectively, of the transition duct. The changing cross section of the transition duct in the direction of axis 28 renders it unfeasible to fabricate the liner as a single component. Accordingly, a plurality of transition duct liner segments extend between the circular and rectangular ends 36 and 37 with adjacent side edges extending in the gas flow direction, only two liner segments 50 and 52 with adjacent axially extending side edges 56 and 58, respectively, separated by a gap 59 being partially illustrated in FIGS. 3 and 4. The liner segments, while schematically illustrated in the drawing figure, are fabricated from porous metal panels such as are described in the aforementioned U.S. Pat. No. 3,584,972. A cooling air plenum 60 is defined between the liner segments and the inner panel 44 and communicates with the cooling air channel 46 so that the plenum is charged with cooling air at a pressure exceeding the gas pressure in the exhaust gas flow path. A support and seal assembly 61 according to this invention is disposed between the inner panel 44 of the transition duct and the liner segments 50 and 52. The assembly 61 supports the liner segments on the transition duct along the side edges 56 and 58 and seals the gap 59 therebetween so that air in the cooling air plenum 60 escapes to the exhaust gas flow path only through the transpiration cooling pores of the liner segments. The support and seal assembly 61 is representative of like assemblies disposed at the gaps between each adjacent pair of liner segments except the assembly at the gap between the leading edge of the final liner segment installed and the trailing edge of the first liner segment installed.

Figure 4:
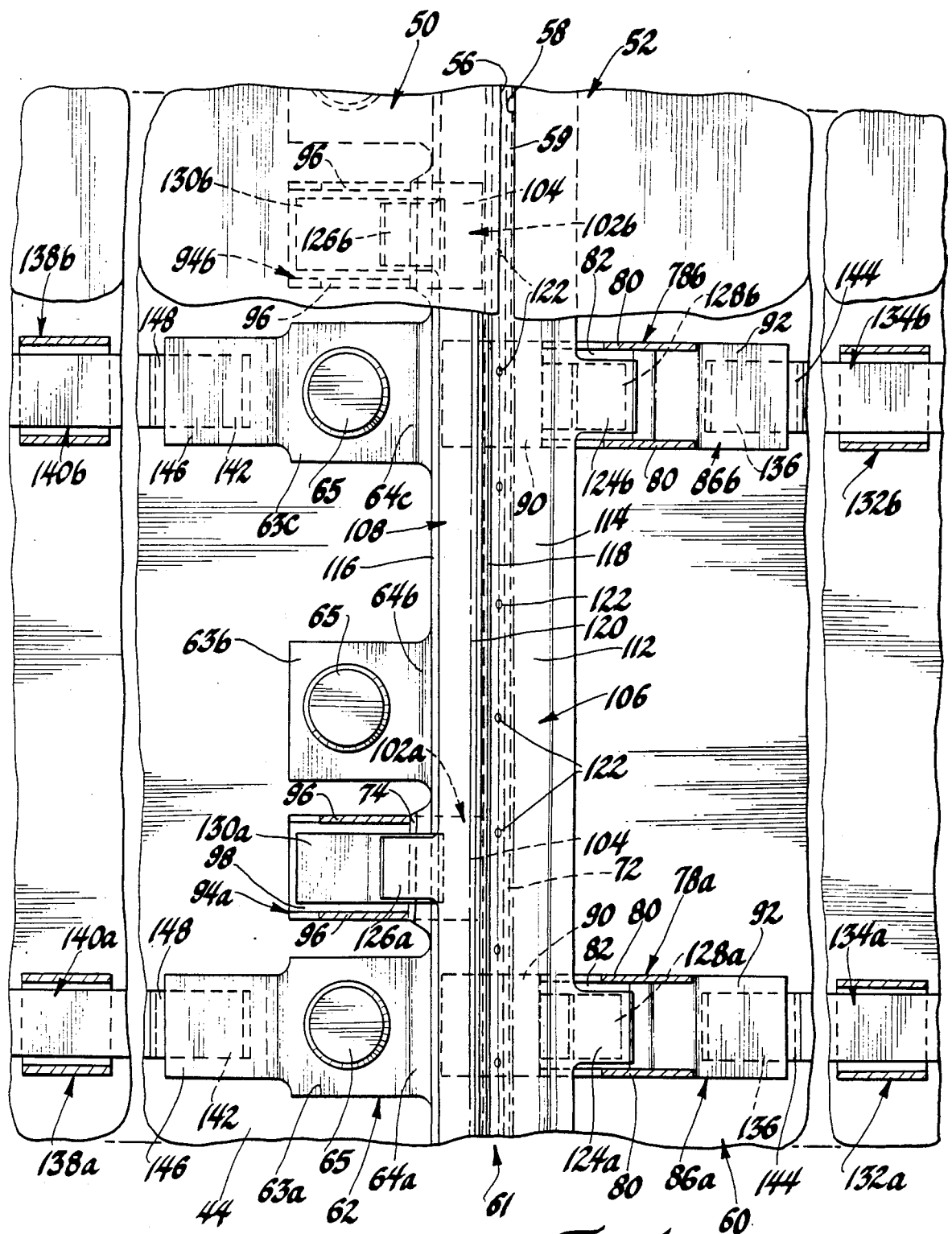
FIG. 4 is a plan view taken generally along the plane indicated by lines 4—4 in FIG. 3.

Referring particularly to FIGS. 3 and 4, the support and seal assembly 61 includes an elongated flat retainer 62 having a plurality of integral, coplanar mounting tabs 63a-c projecting therefrom at intervals along the length of the retainer. Respective ones of a plurality of connecting shoulders 64a-c between the mounting tabs and the retainer are bent to offset the plane of the retainer from the plane of the mounting tabs by a predetermined distance. Each mounting tab has a fastener hole therein which registers with a corresponding hole in the inner panel 44 of the transition duct when the retainer is aligned in the gas flow direction. A plurality of fasteners 65, applied from inside the transition duct, extend through the registered holes in the mounting tabs and the inner panel to attach the retainer to the transition duct. Because of the offset provided by the connecting shoulders 64a-c, a retention space 66, FIG. 3, is defined between an inboard surface 70 of the retainer facing the inner panel 44 and the inner panel. An edge 72 of the retainer 62 opposite the mounting tabs 63a-c is bent away from the inner panel 44 to define an entrance ramp 73 to the retention space 66. An opposite edge 74 of the retainer 62 between the mounting tabs 63a and 63b is bent away from the inner panel 44 at intervals along the edge to define a plurality of entrance ramps 75 to the retention space 66 from the opposite side of the retainer.

The liner segment 52 has a pair of U-shaped mounting clips 78a-b attached thereto at intervals along side edge 58. Each mounting clip has a pair of parallel side walls 80 interconnected by a web 82. Each of the side walls 80 is received in a notch 84, FIG. 3, in the liner segment 52 and attached to the latter, as by brazing, whereby the mounting clips are rigidly attached to the liner segment. A pair of elongated first panel supports 86a-b each have a flat body portion 88 attached, as by welding, to the lower surface of the web 82 of the U-shaped mounting clips 78a-b, respectively. Each panel support has an offset foot 90, FIG. 3, adapted for reception in the retention space 66. The amount by which the connecting shoulders 64a-c offset the retainer 62 from the inner panel 44 corresponds generally to the thickness of the material from which the panel supports are fabricated so that each offset foot 90 on each panel support is snugly but slidably captured in the retention space 66 between the retainer and the inner panel 44. In addition, each of the panel supports 86a-b includes an offset stiffening tab 92 projecting from the side of the mounting clip opposite the offset foot 90. The panel supports 86a-b are oriented perpendicular to the side edge 58 of the liner segment 52 with the offset foot 90 projecting somewhat beyond the side edge 58.

The liner segment 50 has a pair of U-shaped mounting clips 94a-b attached thereto at intervals along side edge 56. Each mounting clip has a pair of parallel side walls 96 interconneced by a web 98. Each of the side walls 96 is received in an appropriate slot 100, FIG. 3, in the liner segment 50 and is brazed or otherwise connected to the liner segment so that the mounting clips 94a-b are rigidly attached to the liner segment 50. The mounting clips 94a-b on the liner segment 50 are offset in the gas flow direction from the mounting clips 78a-b on the liner segment 52, FIG. 4. A pair of second panel supports 102a-b, shorter than the first panel supports 86a-b, are rigidly attached, as by welding, to the lower surfaces of the webs 98 of the U-shaped mounting clips 94a-b, respectively. Each of the panel supports has an offset foot 104 received in the retention space 66. The material from which the second panel supports 102a-b are fabricated has the same thickness as the material from which the first panel supports are fabricated so that each foot 104 is snugly but slidably captured by the retainer 62. The second panel supports 102a-b extend generally perpendicular to the side edge 56 of the liner segment 50.

With continued reference to FIGS. 3 and 4, the support and seal assembly 61 further includes a first sealing strip 106 and a second sealing strip 108 each of which extends substantially the full lengths of the liner segments 50 and 52 in the direction of axis 28. The first sealing strip 106 is an inherently resilient, flexible metal strip and includes a flat attaching portion 110, an integral knee section 112 and a sealing node 114. Similarly, the second sealing strip 108 is an inherently resilient, flexible metal strip having a flat attaching portion 116, an integral knee section 118 folded back over the flat attaching portion, and a sealing node 120. The attaching portion 110 of the first sealing strip 106 is captured between an outboard surface 121 of the retainer 62 opposite the inboard surface 70 and the attaching portion 116 of the second sealing strip 108 and both attaching portions are rigidly connected to the retainer by conventional means, as by welding, whereby the first and second sealing strips are rigidly mounted on the retainer. In unstressed or unflexed conditions, the height of each of the sealing nodes 114 and 120 above the retainer exceeds the height of the cooling air plenum 60 so that with the liner segments in place the knee sections 112 and 118 are flexed and resiliently self-bias the sealing nodes into continuous line contact against the liner segments. Accordingly, the cooling air plenum 60 is sealed at the gap 59 between the liner segments 50 and 52 along the entire length of the gap. A plurality of cooling orifices 122 are formed in the first sealing strip 106 to conduct controlled cooling air flow from plenum 60 to the hot gas space inboard of the gap 59.

To enhance the sealing contact between the sealing nodes and the liner segments, the first sealing strip 106 further includes a pair of axially spaced integral lifting tabs 124a–b projecting therefrom on the opposite side of the sealing node 114 from the knee section 112. To the same end, the second sealing strip 108 further includes a pair of integral, spaced lifting tabs 126a–b projecting from the sealing strip on the side of the sealing node 120 opposite the knee section 118. The lifting tabs 124a–b are aligned with the U-shaped mounting clips 78a–b, respectively, on the liner segment 52 and engage corresponding ones of a pair of cams 128a–b rigidly attached to the webs 82 of the mounting clips between the side walls 80 thereof. Similarly, the lifting tabs 126a–b are aligned with the U-shaped mounting clips 94a–b, respectively, on the liner segment 50 and engage corresponding ones of a pair of cams 130a–b rigidly attached to the upper surfaces of the webs 98 of the mounting clips between the side walls 96 thereof. When the lifting tabs 124a–b and 126a–b are unflexed, the heights of the sealing nodes 114 and 120, respectively, above the distal ends of the lifting tabs exceeds the separation between the cams 128a–b and 130a–b and the liner segments 52 and 50, respectively. Accordingly, when the liner segments and the support and seal assembly 61 are installed on the transition duct, the lifting tabs are flexed by the cams to enhance the self-bias of the knee sections 112 and 118 on the sealing nodes 114 and 120, respectively.

Because the cooling air plenum is charged with compressed air, and because the liner segments are relatively thin, on the order of 0.040 inch for example, the liner segments may be reinforced against inboard flexure toward the gas flow path. To that end, the liner segment 52 has another pair of U-shaped mounting clips 132a–b located centrally thereon and aligned, in the direction of axis 28, with the U-shaped mounting clips 78a–b, respectively. Respective ones of a pair of light, honeycomb beams 134a–b are rigidly attached to the U-shaped clips 132a–b and extend perpendicular to the liner segment side edge 58 and the gas flow direction. Each of the beams 134a–b terminates at a first end 136 near the side edge 58 of the liner segment 52 and at a second end, not shown, near the other side edge of the liner segment. Similarly, the liner segment 50 has another pair of U-shaped mounting clips 138a–b located centrally thereon and aligned, in the direction of axis 28, with the mounting tabs 63a and 63c, respectively, on the retainer 62. Respective ones of a pair of light, honeycomb beams 140a–b are rigidly attached to the U-shaped clips 138a–b and extend perpendicular to the liner segment side edge 56 and the gas flow direction. Each of the beams 140a–b terminates at a first end 142 near the side edge 56 of the liner segment and at a second end, not shown, near the other side edge of the liner segment. The ends 136 on the beams 134a–b on liner segment 52 correspond to the ends of beams 142a–b and the liner segment 50 not illustrated in FIGS. 3 and 4. Likewise, the ends 142 on the beams 140a–b on liner segment 50 correspond to the ends of beams 134a–b on the liner segment 52 not illustrated in FIGS. 3 and 4.

As seen best in FIGS. 3 and 4, each of the stiffening tabs 92 on the first panel supports 86a–b overlaps a wear surface 144 on each of the beams 134a–b at the end 136 thereof and restrains movement of the end of the beam toward the gas flow path. Each of the mounting tabs 63a and 63c on the retainer 62 has an offset stiffening extension 146 which extends away from the gap 59 between the liner segments and overlaps a wear surface 148 on each of the beams 140a–b at the end 142 of the latter. The stiffening extensions 146 restrain movement of the ends 142 of the beams 140a–b toward the gas flow path.

The installation of the liner segments and the support and seal assemblies proceeds as follows. From inside the transition duct 32, the retainer 62, with the sealing strips 106 and 108 thereon, is oriented in the direction of axis 28 with holes in the mounting tabs in register with the corresponding holes in the inner panel 44. Appropriate fasteners 65 are then inserted in the registered holes and tightened to attach the retainer to the inner panel. Liner segment 52 is positioned adjacent and advanced toward the retainer 62, from the right side thereof, FIGS. 3 and 4. Concurrently, each foot 90 on each of the first panel supports 86a–b is guided into the retention space 66 by the ramp 73 on the retainer and each lifting tab 124a–b on the first sealing strip 106 engages and is flexed by the corresponding cam 128a–b as the sealing node initiates line contact with the liner segment. Next, the liner segment 50 is aligned to the left, FIGS. 3 and 4, of the retainer such that the beams 140a–b register with the stiffening extensions 146 and the U-shaped clips 94a–b register with the ramps 75. The liner segment 50 is then advanced toward the liner segment 52 over the fasteners holding the retainer on the transition duct. Concurrently, each offset end portion 104 on each of the second panel supports 102a–b is guided by a corresponding one of the ramps 75 into the retention space 66, the stiffening extensions 146 slide over the wear surfaces 148 on the beams 140a–b, and the lifting tabs 126a–b on the second sealing strip 108 engage the cams 130a–b as the sealing node 120 engages the liner segment 50 in line contact along the length of the side edge 56. When the liner segments are thus mounted on the transition duct, each can slide relative to the retainer to accommodate thermal growth while the sealing nodes maintain the required air seal. Also, because the beams 134a–b and 140a–b are restrained at opposite ends through sliding connections, outward flexure of the liner segments is resisted while thermal growth is once again accommodated.

Successive liner segments are installed through repetition of the above procedure. Of course, an atypical or special seal and support assembly is required for adjacent side edges of the first and last of the liner segments installed because that assembly must be accessible from inside the transition duct after all liner segments are installed. Such atypical or special assemblies form no part of this invention. One possible atypical seal and support assembly suitable for the final assembly step could include a retainer similar to the retainer 62 of the assembly 61 which is located directly inboard of a wider gap corresponding to gap 59. In such an arrangement, adjacent side edges of the liner segments are brought simultaneously into engagement with the retainer and then the fasteners for attaching the retainer to the transition duct are installed through appropriate recesses in the liner segments which are separated from the colling air plenum 60 to prevent escape of cooling air.

The embodiments of the invention in which an exclusive property or privilege is claimed are defined as follows:

1. In a gas turbine engine having a case assembly including a transition duct defining an exhaust gas flow path from a turbine of said engine to an exhaust discharge of said engine, a plurality of porous metal liner segments adapted for disposition on said duct in spaced relation thereto and cooperating therewith in defining a cooling air plenum between said liners and said duct, said liner segments having side edges extending in the direction of gas flow in said exhaust gas flow path, and means for conducting cooling air to said cooling air plenum at a pressure exceeding the gas pressure in said exhaust gas flow path, a support and seal assembly comprising:

an elongated retainer disposed in said cooling air plenum having an inboard surface and an outboard surface each extending in the gas flow direction in said exhaust gas flow path and parallel to said liner segment side edges, means rigidly attaching said retainer to said duct with said inboard surface separated from said duct and defining a retention space therebetween, a plurality of first panel supports rigidly attached to one of said plurality of liner segments at intervals along a first side edge thereof and extending perpendicular to said first side edge, a distal end of each of said first panel supports projecting into said retention space from one side of said retainer and being captured therein so that said first side edge of said one liner segment is attached to said duct, a plurality of second panel supports rigidly attached to another of said plurality of liner segments immediately adjacent said one liner segment at intervals along a second side edge of said other liner segment parallel to said first side edge of said one liner segment and extending perpendicular to said second side edge, a distal end of each of said second panel supports projecting into said retention space from the side of said retainer opposite said one side and being captured therein so that said second side edge of said other liner segment is attached to said duct, a first sealing strip having a first sealing node extending the length thereof, a second sealant strip having a second sealing node extending the length thereof, means rigidly attaching each of said first and said second sealing strips to said retainer on said outboard surface thereof with said first sealing node engaging said one liner segment in continuous line contact adjacent said first side edge thereof and with said second sealing node engaging said other liner segment in continuous line contact adjacent said second side edge thereof so that said cooling air plenum is sealed at the gap between said one and said other liner segments, and means biasing each of said first and said second sealing nodes into engagement on corresponding ones of said one and said other liner segments.

2. The support and seal assembly recited in claim 1 wherein said means biasing each of said first and said second sealing nodes into engagement on corresponding ones of said one and said other liner segments includes a pair of resilient knee sections integral with respective ones of said first and said second sealing strips whereby each of said first and said second sealing nodes is self-biased into engagement on corresponding ones of said one and said other liner segments.

3. The support and seal assembly recited in claim 2 and further including:

means on said first sealing strip defining a first lifting tab thereon on the side of said first sealing node opposite the corresponding one of said knee sections, means on said second sealing strip defining a second lifting tab thereon on the side of said second sealing node opposite the corresponding one of said knee sections, means on said one liner segment defining a first cam in said cooling air plenum engageable on said first lifting tab and operative to resiliently flex said first lifting tab so that said first sealing node is further resiliently biased against said one liner segment, and means on said other liner segment defining a second cam in said cooling air plenum engageable on said second lifting tab and operative to resiliently flex said second lifting tab so that said second sealing node is further resiliently biased against said other liner segment.

4. The support and seal assembly recited in claim 3 wherein said means rigidly attaching said retainer to said duct with said inboard surface separated from said duct and defining a retention space therebetween includes a plurality of planar mounting tabs integral with said retainer located at intervals along one side of said retainer in a common plane offset from the plane of said inboard surface, and means operative to rigidly attach each of said mounting tabs to said duct so that said retainer is mounted on said duct with said inboard surface spaced from and cooperating with said duct in defining a retention space therebetween.

* * * * *